US008287007B2

(12) United States Patent
Reiter

(10) Patent No.: US 8,287,007 B2
(45) Date of Patent: Oct. 16, 2012

(54) PLASTIC-METAL CONNECTION AND FUEL INJECTOR HAVING A PLASTIC-METAL CONNECTION

(75) Inventor: Ferdinand Reiter, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 147 days.

(21) Appl. No.: 12/086,924

(22) PCT Filed: Oct. 30, 2006

(86) PCT No.: PCT/EP2006/067909

§ 371 (c)(1),
(2), (4) Date: Dec. 5, 2008

(87) PCT Pub. No.: WO2007/073963

PCT Pub. Date: Jul. 5, 2007

(65) Prior Publication Data

US 2009/0179090 A1 Jul. 16, 2009

(30) Foreign Application Priority Data

Dec. 22, 2005 (DE) ........................... 102005061408

(51) Int. Cl.
*F16L 33/00* (2006.01)

(52) U.S. Cl. ....................................................... 285/239

(58) Field of Classification Search .................. 285/239, 285/242, 256
See application file for complete search history.

(56) References Cited

U.S. PATENT DOCUMENTS 585,014 A * 6/1897 Wenzel et al. ................ 285/239
1,106,542 A * 8/1914 Buehner ....................... 285/242
1,987,499 A * 1/1935 Tabozzi ........................ 285/239
2,139,745 A * 12/1938 Goodall ........................ 285/253
2,147,355 A * 2/1939 Scholtes ....................... 285/258
2,805,088 A * 9/1957 Swick, Jr. et al. ............. 285/239
3,210,100 A * 10/1965 Thebeault et al. ............ 285/239
3,224,794 A * 12/1965 Crissy .......................... 285/256
3,653,692 A * 4/1972 Henson ......................... 285/242
3,687,491 A * 8/1972 Marshall ....................... 285/242
4,330,142 A * 5/1982 Paini ............................ 285/256
4,603,888 A * 8/1986 Goodall et al. ............... 285/243
4,875,719 A * 10/1989 Mylett .......................... 285/239
5,076,615 A * 12/1991 Sampson ...................... 285/259
5,165,733 A * 11/1992 Sampson ...................... 285/259
5,487,571 A * 1/1996 Robertson ..................... 285/256

(Continued)

FOREIGN PATENT DOCUMENTS

DE 40 08 675 9/1991

(Continued)

*Primary Examiner* — David E Bochna
(74) *Attorney, Agent, or Firm* — Kenyon & Kenyon LLP

(57) ABSTRACT

A fuel injector for fuel ignition systems of internal combustion engines includes a magnetic circuit having a core, a magnetic coil and an armature, and a movable valve needle, which has a valve-closure member that cooperates with a fixed valve seat, the valve seat being shaped on a valve-seat member and being provided with a valve-seat support in which the valve-seat member is inserted. At least one metallic component of the fuel injector, in this context, has a serrated structure on its outer circumference for producing a solid connection to a corresponding component made of plastic. The plastic components may be the connection piece, the valve-seat support, the coil shell and the connecting pipe of the valve needle. The fuel injector is particularly suitable for use in fuel-injection systems of mixture-compressing internal combustion engines having externally supplied ignition.

6 Claims, 4 Drawing Sheets

U.S. PATENT DOCUMENTS

| | | | | | |
|---|---|---|---|---|---|
| 5,853,202 | A | * | 12/1998 | Li et al. | 285/256 |
| 5,967,424 | A | | 10/1999 | Bonnah, II | |
| 6,050,608 | A | * | 4/2000 | Hattori et al. | 285/242 |
| 6,318,763 | B1 | * | 11/2001 | Huang | 285/256 |
| 6,899,355 | B2 | * | 5/2005 | Klein et al. | 285/239 |
| 2007/0095745 | A1 | | 5/2007 | Sebastian | |

FOREIGN PATENT DOCUMENTS

| | | |
|---|---|---|
| DE | 195 03 224 | 8/1996 |
| DE | 103 34 785 | 2/2005 |
| DE | 10 2004 010174 | 9/2005 |
| JP | 59-4515 | 1/1984 |
| JP | 5-60203 | 3/1993 |
| JP | 7-2642 | 1/1995 |
| JP | 10-196618 | 7/1998 |
| JP | 2001-322507 | 11/2001 |
| JP | 2002-532666 | 10/2002 |
| JP | 2005-9421 | 1/2005 |
| JP | 2005-337266 | 12/2005 |
| WO | 97/22798 | 6/1997 |
| WO | WO 00/36327 | 6/2000 |
| WO | 2005/064148 | 7/2005 |

* cited by examiner

PLASTIC-METAL CONNECTION AND FUEL INJECTOR HAVING A PLASTIC-METAL CONNECTION

FIELD OF THE INVENTION

The present invention relates to a plastic-metal connection and to a fuel injector having a plastic-metal connection.

BACKGROUND INFORMATION

FIG. 1 shows a known fuel injector from the related art, which has a classical three-part construction of an inner metallic flow guidance part and a housing component at the same time. This inner valve pipe is formed by an intake nipple forming an inner pole, a nonmetallic intermediate part and a valve-seat support accommodating a valve seat. In the valve-seat support there is situated an axially movable valve needle, which includes an armature and a ball-shaped valve-closure member, as well as a connecting pipe connecting the armature to the valve-closure member. The three individual components of the valve needle are solidly connected to one another, using a continuous material jointing method, especially welding.

Such an electromagnetically operable valve in the form of a fuel injector is discussed in DE 40 08 675 A1. The inner valve pipe forms the skeleton of the entire injector and overall has a substantial supporting function from the three individual components. The nonmagnetic intermediate part is connected by welding seams both tightly and solidly to the intake nipple as well as to the valve-seat support. The windings of a magnetic coil (solenoid) are inserted into a spool holder of plastic which, in turn, surrounds a part of the intake nipple used as the inner pole and also the intermediate part, in the circumferential direction. In the valve-seat support there is situated an axially movable valve needle, which includes a sleeve-shaped armature and a ball-shaped valve-closure member, as well as a connecting pipe connecting the armature to the valve-closure member. The connecting pipe is connected solidly to the armature and also to the valve-closure member by welding seams. The valve-closure member cooperates with a frustoconical valve seat surface of a metallic valve seat member. The valve-seat member is solidly connected to the valve-seat support by a welding seam.

A further electromagnetically operable valve in the form of a fuel injector is discussed in DE 195 03 224 A1. The fuel injector has a ball-shaped valve-closure member collaborating with a valve seat which is mounted at a closure-member support in the form of a plastic pipe, while at the end lying opposite to the valve-closure member, an armature is fastened to the plastic pipe. Together, these components form an axially movable valve needle. The lower end of the plastic pipe is dome-shaped, in the dome-shaped recess, the valve-closure member being held in place with form locking, using a snap-fit connection. The plastic pipe is developed in a springy manner in the area of the lower recess, since holding jaws have to encompass the valve-closure member. The ball-shaped valve-closure member may be made of steel, a ceramic or a plastic. The valve-closure member collaborates with a frustoconical valve-seat surface of a metallic valve-seat member. The valve-seat member is solidly connected to the valve-seat support by a welding seam.

SUMMARY OF THE INVENTION

The plastic-metal connection according to the present invention has the advantage that it is simple and cost-effective to produce, and in spite of that, an automatic assembly is ensured. The plastic-metal press-fit connections are manufactured particularly securely and reliably because in the overlapping areas of the respective components, that are to be joined, serrated (saw tooth-like) structures are developed in optimized fashion at least on the metallic component. The serrated structure of the metallic component penetrates into the plastic of the corresponding component and deforms it elastically, whereby a relaxation of the plastic into the serrated structure takes place. The development according to the exemplary embodiments and/or exemplary methods of the present invention guarantees a high security from the loosening of the connection by withdrawal counter to the assembly direction, and offers, in addition, great torsion-proofness, which is especially desirable if the two corresponding components have to remain in a certain rotary position with respect to each other. In addition, chip formation during assembly is excluded.

Advantageous further refinements of and improvements to the plastic-metal connection described herein are rendered possible by the measures also described herein.

The fuel injector according to the present invention has the advantage that simplified and cost-effective production and automatic assembly of many individual components, and thus the entire valve, is feasible, since one may do without continuous material jointing methods such as welding, which have the disadvantage of a thermal lag, and costly form-locking connecting techniques. Rather, particularly advantageous press-fit connections between a metallic component partner and a component partner of plastic may be used, which are able to be applied simply and very securely and reliably. The device according to the present invention has the advantage, in addition, of a reduction in the structure-borne noise and thus noise development compared to known design approaches.

Plastic-metal press-fit connections are manufactured particularly securely and reliably if, in the overlapping areas of the respective components, that are to be joined, serrated structures are developed in optimized fashion at least on the metallic component. The serrated structure of the metallic component penetrates into the plastic of the corresponding component and deforms it elastically, whereby a relaxation of the plastic into the serrated structure takes place.

It is particularly advantageous to manufacture the connection piece, the valve-seat support and the valve needle, in addition to the coil shell and the electric plug connector of one plastic material, which are then solidly connected, respectively, to metallic components of the fuel injector. In this way, the mass of the fuel injector may clearly be reduced. The reduced mass of these components brings about the advantages of better dynamics of the valve and of reduced noise development.

In addition, it is advantageous to develop a further profiled region at the serrated structure. This profiled region is developed as a milled edge that is formed by a plurality of perpendicular or slantwise parallel grooves, furrows or raised portions that are distributed over the circumference. By the use of this profiled region, it is advantageously ensured that the metallic component is fixed in the sleeve-shaped plastic component in a form-locking and absolutely torsion-proof manner. The profiled region may be provided at both ends of the serrated structure of the metallic component, in this context.

Exemplary embodiments of the present invention are depicted in simplified form in the drawings and explained in greater detail in the description below.

DETAILED DESCRIPTION

Figure 1:
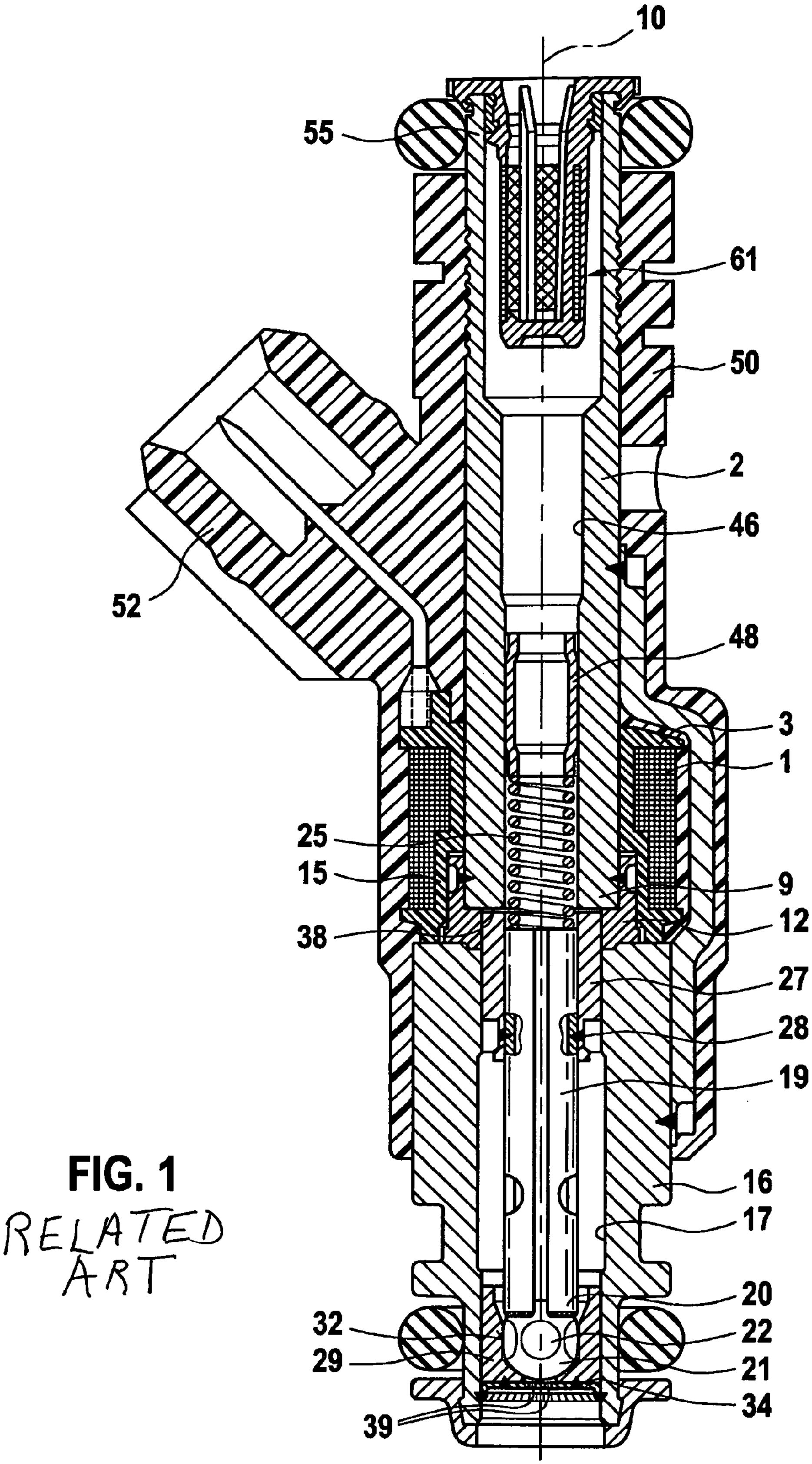
FIG. 1 RELATED ART
FIG. 1 shows a fuel injector in a known embodiment according to the related art.

For the better understanding of the exemplary embodiments and/or exemplary methods of the present invention, FIG. 1 shows a fuel injector in a known embodiment according to the related art. The valve that is operable electromagnetically, shown in exemplary fashion in FIG. 1 in the form of an injector for fuel injection systems of mixture-compressing, externally ignited internal combustion engines, has a core 2, surrounded by a magnetic coil 1, used as fuel intake neck and inner pole, which is developed pipe-shaped in this case, and has a constant outer diameter over its entire length. A coil shell 3 graded in the radial direction accommodates the winding of magnetic coil 1 and, in conjunction with core 2, enables the fuel injector to have a compact design in the region of magnetic coil 1.

A tubular, metallic nonmagnetic intermediate part 12 is connected to a lower core end 9 of core 2, e.g. by welding, so as to form a seal and be concentric to a longitudinal valve axis 10, the intermediate part partially surrounding core end 9 in an axial manner. Graded coil shell 3 partially covers core 2, and its step 15 having a greater diameter axially covers at least a portion of intermediate part 12. A tubular valve-seat support 16, which is solidly connected to intermediate part 12, extends downstream from coil shell 3 and intermediate part 12. A longitudinal bore 17, which is concentric to longitudinal valve axis 10, runs through valve-seat support 16. Situated in longitudinal bore 17 is a tubular valve needle 19, whose downstream end 20 is connected, for example by welding, to a spherical valve-closure member 21, on whose periphery, for instance, five flattenings 22 are provided for the fuel to flow past. Valve needle 19 represents the movable actuating part of the fuel injector.

The fuel injector is actuated electromagnetically, in a known manner. For the axial displacement of valve needle 19, and thus for the opening counter to the spring force of a restoring spring 25, or for the closing of the fuel injector, the electromagnetic circuit having magnetic coil 1, core 2 and an armature 27 is utilized. Armature 27 is connected to the end of valve needle 19 facing away from valve-closure member 21, by a welded seam 28, and is aligned with core 2. In longitudinal bore 17, a cylindrical metallic valve-seat member 29, having a fixed valve seat 30, is mounted in the downstream end of valve-seat support 16 facing away from core 2, using welding, so as to form a seal.

A guide opening 32 of valve-seat member 29 is used to guide valve-closure member 21 along longitudinal axis 10, during the axial movement of valve needle 19 with armature 27. Spherical valve-closure member 21 interacts with the valve seat of valve-seat member 29, which is frustoconically tapered in the direction of flow. At its end face 17 facing away from valve-closure member 21, valve-seat member 29 is concentrically and securely joined to a, for instance, cup-shaped apertured disk 34. In the base part of apertured disk 34 there runs at least one, but for example four spray-discharge openings 39, that are shaped by erosive machining or stamping.

The insertion depth of valve-seat member 29 having cup-shaped, apertured spray disk 34 presets the lift of valve needle 19. In the case of magnetic coil 1 not being excited, the one end position of valve needle 19 is established by the contact of valve-closure member 21 with the valve seat of valve-seat member 29, while, in the case of magnetic coil 1 being excited, the other end position of valve needle 19 results from the contact of armature 27 with core end 9.

An adjustment sleeve 48, which is inserted into a flow bore 46 of core 2 running concentrically to longitudinal valve axis 10 and may be formed from rolled spring steel, for example, is used to adjust the initial spring tension of restoring spring 25 resting against adjustment sleeve 48, and whose opposite side is in turn braced against valve needle 19. The injector is largely enclosed in a plastic extrusion coating 50. Part of this plastic extrusion coating 50 is a likewise extruded electrical connection plug 52, for instance. Fuel filter 61 extends into flow bore 46 of core 2, at its inflow-side end 55, and filters out fuel components whose size could cause blockages or damage in the fuel injector.

Figure 2:
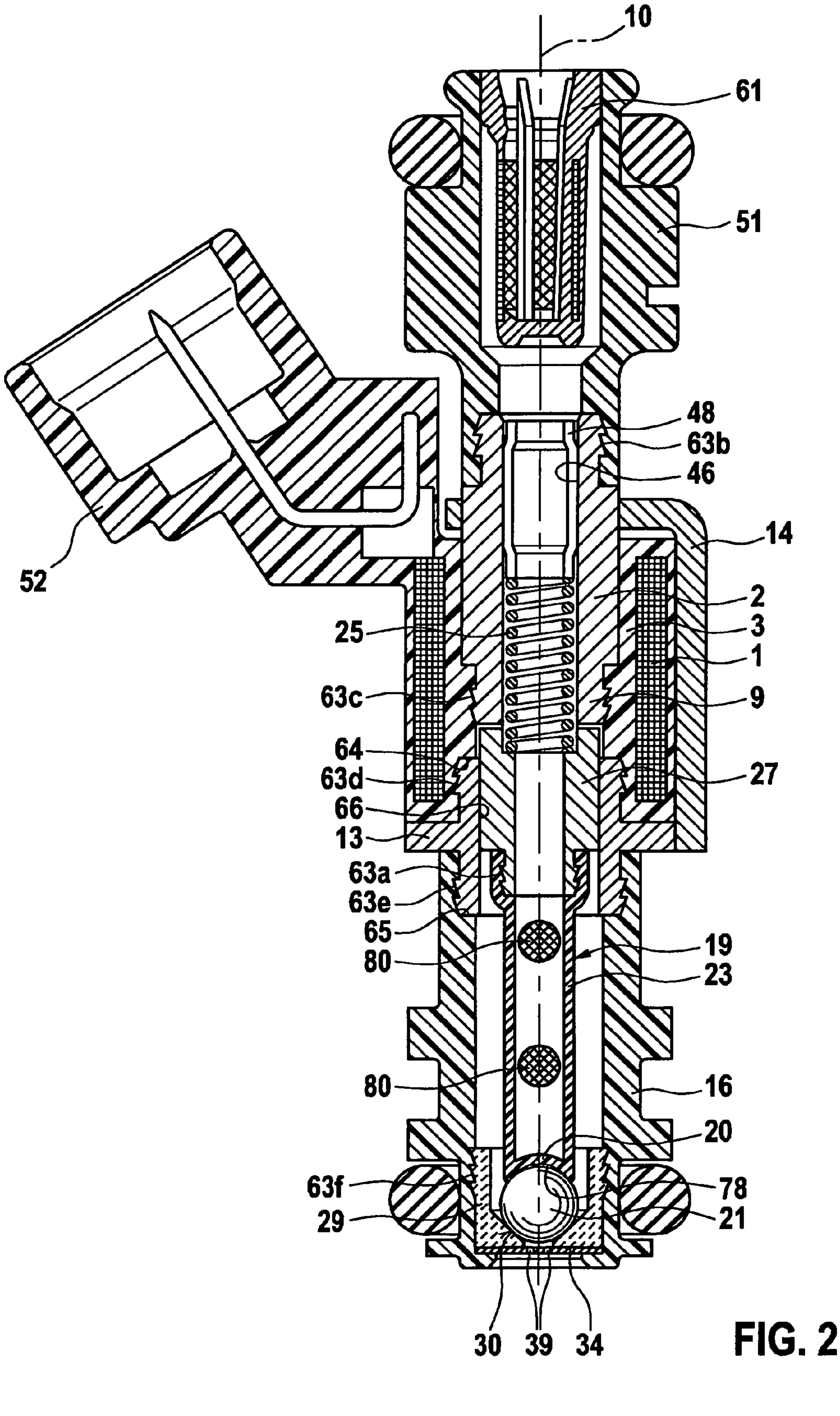
FIG. 2 shows an exemplary embodiment of a fuel injector according to the present invention having a plurality of fixed plastic-metal connections between two components of the fuel injector, in each case.
Figure 3:
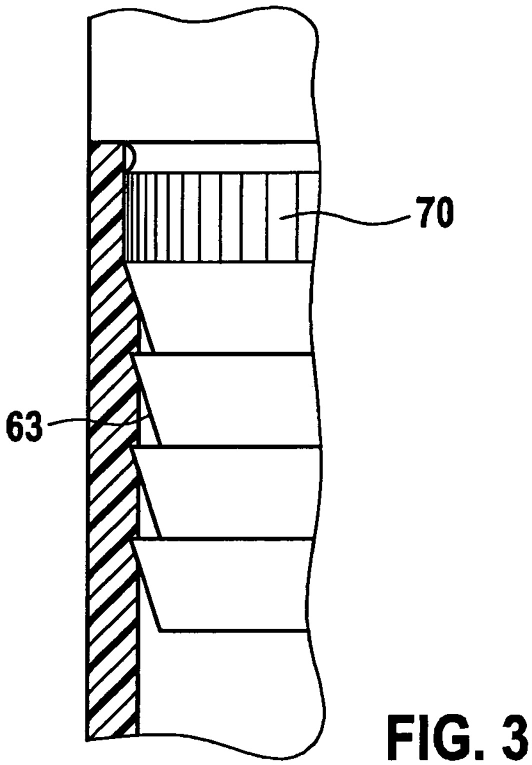
FIG. 3 shows a first additional exemplary embodiment of a plastic-metal connection in a detailed view.

FIG. 2 shows a further exemplary embodiment of a fuel injector according to the present invention. The fuel injector is developed using a particularly simple and light construction. For this purpose, several components of the fuel injector are made, for example, of a plastic or a ceramic material, which makes possible a reduction in mass of the fuel injector. Whereas in the known fuel injector according to FIG. 1, exclusively plastic extrusion coating 50 having plug connector 52 and coil shell 3 are executed in plastic, in plastic-metal connection according to the present invention, for instance, additionally the components valve seat support 16 and valve needle 19 are made of plastic. We therefore can no longer speak of a plastic extrusion coating of the fuel injector in the classical sense, since several of the components forming the valve housing are themselves made directly of plastic. A connection piece 51 of plastic forms, for instance, the inflow channel of the fuel injector, and thus takes up fuel filter 61. Coil shell 3 is, for instance, developed in such a way that from it there proceeds in one part electrical plug connector 52.

In the embodiment shown, valve needle 19 is made of three individual components which together form the component valve needle 19. Armature 27, which is developed, for instance, as a rotary part, in this context forms a first individual component, while a ball-shaped valve-closure member 21 represents a second individual component of valve needle 19. A connecting pipe 23 connecting armature 27 to valve-closure member 21 represents a closure-member support. Connecting pipe 23 is produced, for instance, using plastic extrusion, and has an internal longitudinal opening from which several lateral openings open out. The lateral openings may optionally be provided with a sifting web 80 made of plastic or metal, which is mounted as an insertion part in the extrusion process of connecting pipe 23.

At the lower end facing valve-closure member 21, armature 27 has a serrated structure 63*a* having a "fir tree profile". This structure 63*a* corresponds to an upper, widened end of connecting pipe 23, made of plastic.

To produce a secure connection between armature 27 and connecting pipe 23, armature 27 is pressed using its structure 63*a* into connecting pipe 23, and this is done in a manner so that structure 63*a* interlocks and braces itself solidly, securely, and torsionally fixed, at the end of connecting pipe 23. In order to accommodate valve-closure member 21, connecting pipe 23 is provided with an arched, or rather dome-shaped recess 78. The arched accommodation surface of recess 78 ideally has a slightly smaller diameter than the diameter of ball-shaped valve-closure member 21, whereby, after mounting valve-closure member 21, by applying a slight contact force, a force-locking connection is created between connecting pipe 23 and valve-closure member 21. Valve-closure member 21 is drawn securely, reliably and reproducibly from valve seat 30 of valve seat member 29, via connecting pipe 23 when current is applied to magnetic coil 1, although valve-closure member 21 is held "loosely" to connecting pipe 23. A ceramic material, for instance, $Si_3N_4$, is an option as the material for valve-closure member 21 that is developed as a full sphere. However, valve-closure member 21 may be made of metal or ceramic or a plastic.

Comparably to the serrated structure 63*a* having a "fir tree profile" developed at armature 27, additional serrated structures 63 may be provided to produce secure connections between fuel injector components made of metal and plastic. Thus, core 2, at its two axial ends, in each case has a serrated structure 63*b*, 63*c*, which is there for the purpose that, when core 2 is pressed in, both a secure and reliable solid connection is ensured to connection piece 51 made of plastic and also to coil shell 3 made of plastic. By pressing core 2 into connection piece 51 and coil shell 3, serrated structure 63*b*, 63*c* of metallic component core 2 penetrates into the plastic of the respectively corresponding joining partner, and the plastic subsequently relaxes, so that a secure and reliable solid connection is ensured between these components.

Two further serrated structures 63*d*, 63*e* having "fir tree profiles" are provided at a metallic, magnetically conductive intermediate part 13, which is situated below coil shell 3 in the axial extension area of armature 27. This annular intermediate part 13 is T-shaped in profile, for instance, two legs of the T profile having structures 63*d*, 63*e*, and thus make for a solid, secure connection to coil shell 3 and to valve seat support 16. The third leg of the T profile of intermediate part 13, that is directed outwards, is connected to a magnetic cup 14 that represents an outer magnetic component, by which the magnetic circuit is closed.

The inner walls of coil shell 3 and valve seat support 16 are formed to have a slightly offset, largely flat surface, at least in a certain overlapping region of intermediate part 13 and coil shell 3 and valve seat support 16. These surfaces of coil shell 3 and valve seat support 16 correspond to the serrated designed structure 63*d*, 63*e* at intermediate part 13. Intermediate part 13 is pressed into these components to produce solid connections to coil shell 3 and valve seat support 16, and this is done in such a way that structure 63*d*, 63*e* interlocks and braces solidly, securely and torsionally fixed at the surfaces and coil shells 3 and valve seat support 16. By corresponding shoulders 64, 65 on coil shell 3 and valve seat support 16, the depth of pressing in of intermediate part 13 into these components may be established, at which intermediate part 13 then lies against them in the pressed-in state. The guidance of axially movable armature 27 takes place, for instance, in inside opening 66 of intermediate part 13.

Valve-seat member 29, which is made of a metallic or a ceramic material is set into the lower end of valve-seat support 16 that is made of plastic. The ceramic material $Si_3N_4$ is an option as the material for valve-seat member 29. Such a material has only ca. ⅓ the mass of a comparably large component made of steel, as is commonly used. Valve-seat member 29 is also developed at its outer circumference to have a serrated structure 63*f*, which may be designated as a "fir tree profile". To produce a secure connection between valve seat-member 29 and valve-seat support 16, valve-seat member 29 is pressed, using its structure 63*a*, into valve seat support 16, and this is done in a manner so that structure 63*f* interlocks and braces itself solidly, securely, and torsionally fixed, at the lower end of valve-seat support 16. Serrated structure 63*f* of the of valve-seat member 29 thus penetrates into the plastic of valve-seat support 16 and deforms it elastically, whereby a relaxation of the plastic into serrated structure 63*f* takes place.

In FIGS. 3, 4, 5,and 6 four further exemplary embodiments of a plastic-metal connection are shown, in each case in a detailed view. These connecting regions may be provided at any place in the fuel injector at which components of plastic and metal correspond with each other to form a solid connection. In addition to the plastic-metal connections indicated in FIG. 2, which distinguish themselves exclusively by their serrated structure 63, the plastic-metal connections shown in FIGS. 3 and 4 have an additional profiled region 70. This profiled region 70 is developed, for instance, as a milled edge that is formed by a plurality of perpendicular or slantwise parallel grooves, furrows or raised portions that are distributed over the circumference. By the use of this profiled region 70, it is advantageously ensured that the metallic component is fixed in the sleeve-shaped plastic component in a form-locking and absolutely torsion-proof manner. Profiled region 70 may be provided, in this context, at both ends of the serrated structure 63 of the metallic component, as FIG. 6 makes clear.

Figure 5:
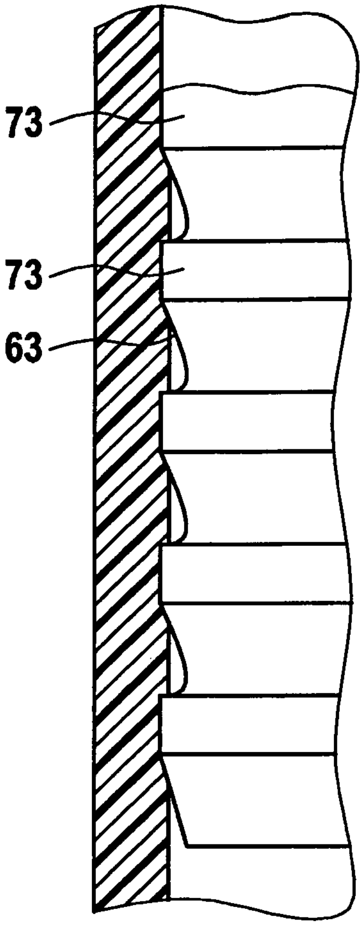
FIG. 5 shows a third additional exemplary embodiment of a plastic-metal connection.
Figure 4:
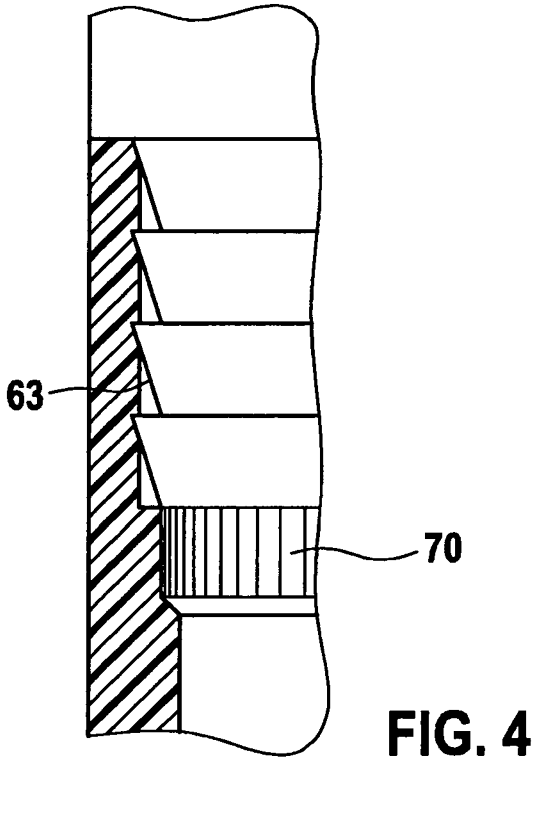
FIG. 4 shows a second additional exemplary embodiment of a plastic-metal connection.
Figure 6:
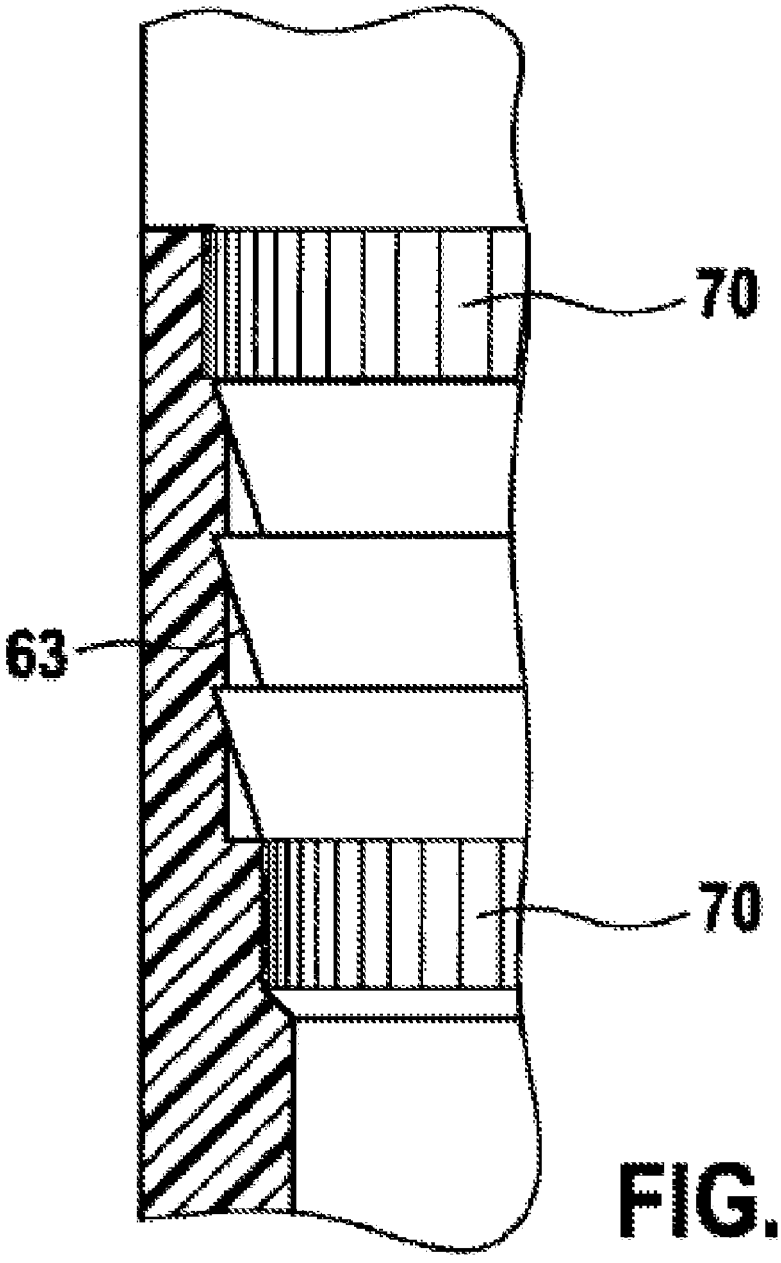
FIG. 6 shows a fourth additional exemplary embodiment of a plastic-metal connection.

FIG. 5 shows an alternative exemplary embodiment of a plastic-metal connection, in a detailed view. Serrated structure 63 is repeatedly interrupted by cylindrical sections 73, in this instance. Such a structure 63, having sections 73 lying between them, may also be additionally provided with a profiled region 70.

The tooth shape of serrated structure 63 may be developed to be directly running in in a pointed manner, in a slantwise or perpendicular manner having a bend, or in an arched manner, or in combinations thereof. Serrated structure 63 is formed in each case of several circumferential teeth that are developed in a successive manner. In particular, 2 to 15 circumferential teeth are provided for a structure 63.

In the direction towards cylindrical section 73, structure 63 may be developed to end in sharp edges or smoothly (FIG. 5).

The excitable actuator of the fuel injector as an electromagnetic circuit, having magnetic coil 1, core 2, intermediate part 13, magnetic cup 14 and armature 27 may also be developed, for instance, as a piezoelectric or a magnetostrictive drive.

What is claimed is:

1. A plastic-metal connection arrangement, comprising:

a plastic-metal connection between a metallic component and a component made of a plastic, the metallic component corresponding to the component made of the plastic, so as to form a secure and solid connection;

a serrated structure;

wherein the metallic component is pressed into the component made of plastic, and wherein the serrated structure is provided, at least on the metallic component, in an overlapping region with the component made of plastic, wherein an additional profiled region is provided separately from the serrated structure at both ends of the serrated structure, wherein the profiled region connects the metallic component to the plastic component in a torsionally fixed manner, and wherein the profiled region is arranged as a milled edge.

2. The plastic-metal connection of claim 1, wherein a plurality of consecutive circumferential teeth forms the structure.

3. The plastic-metal connection of claim 2, wherein 2 to 15 circumferential teeth form the structure.

4. The plastic-metal connection of claim 1, wherein the milled edge is formed by a plurality of parallel perpendicular or slantwise-arranged grooves, furrows or raised portions, which are distributed over the circumference, at at least one of the two ends of the structure.

5. The plastic-metal connection of claim 1, wherein the serrated structure is interrupted between the teeth by cylindrical sections.

6. The plastic-metal connection of claim 1, wherein the tooth shape of serrated structure is developed to be directly running in at least one of a pointed arrangement, a slantwise arrangement having a bend, a perpendicular arrangement having a bend, and an arched arrangement.

* * * * *